Figure 1:
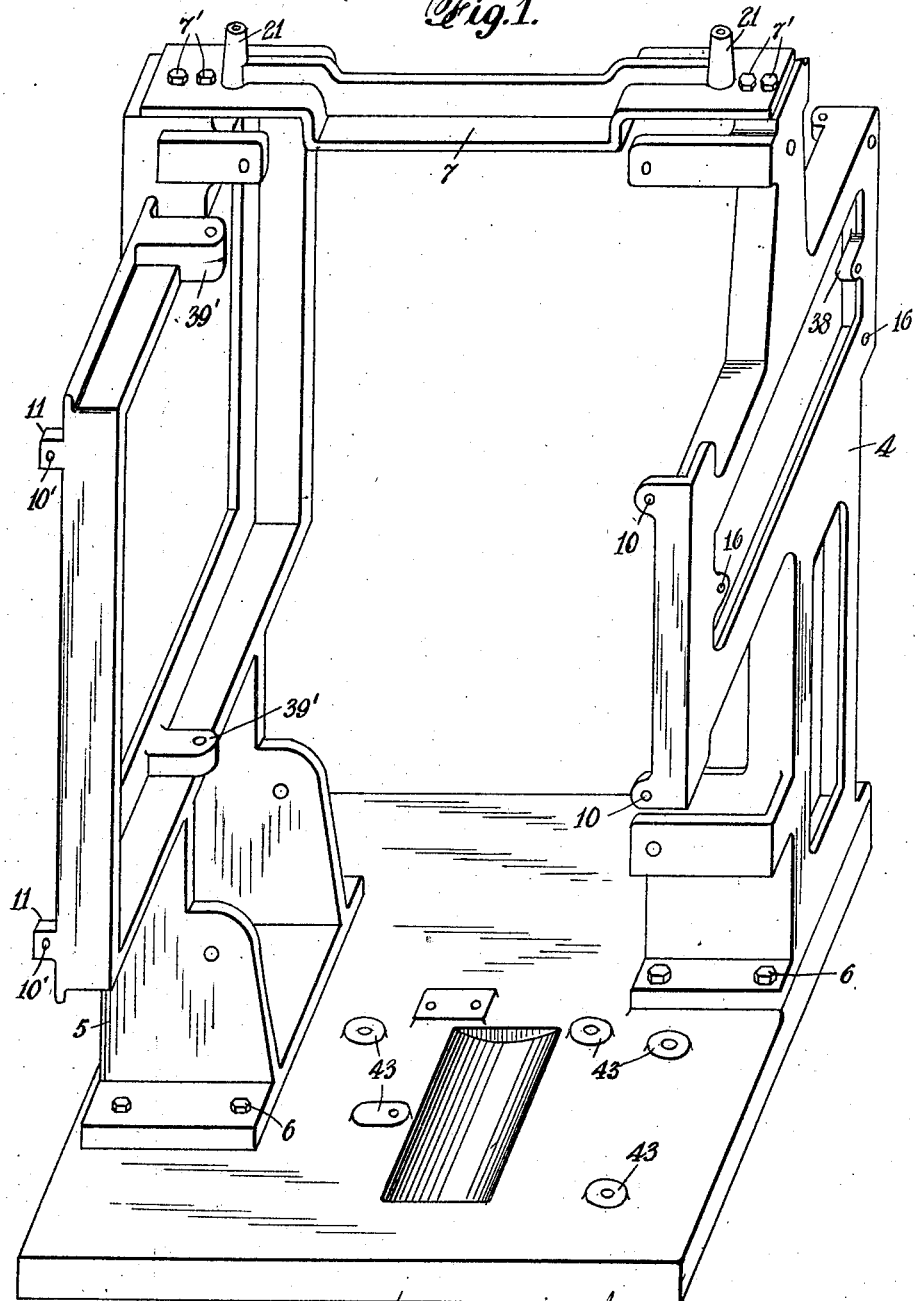

July 1, 1930.  W. T. BIRDSALL  1,769,050
PROJECTOR
Filed June 10, 1926   4 Sheets-Sheet 1

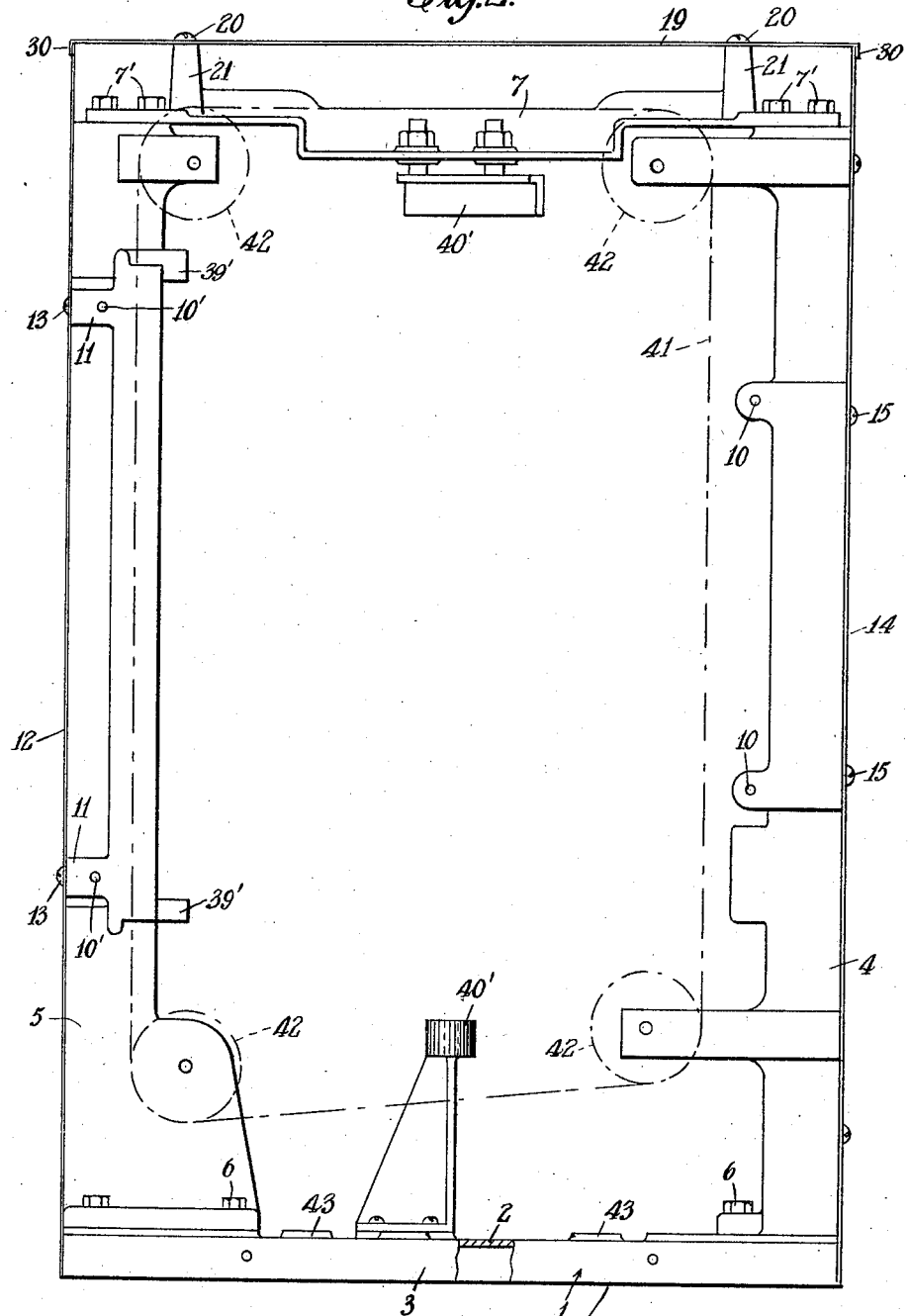

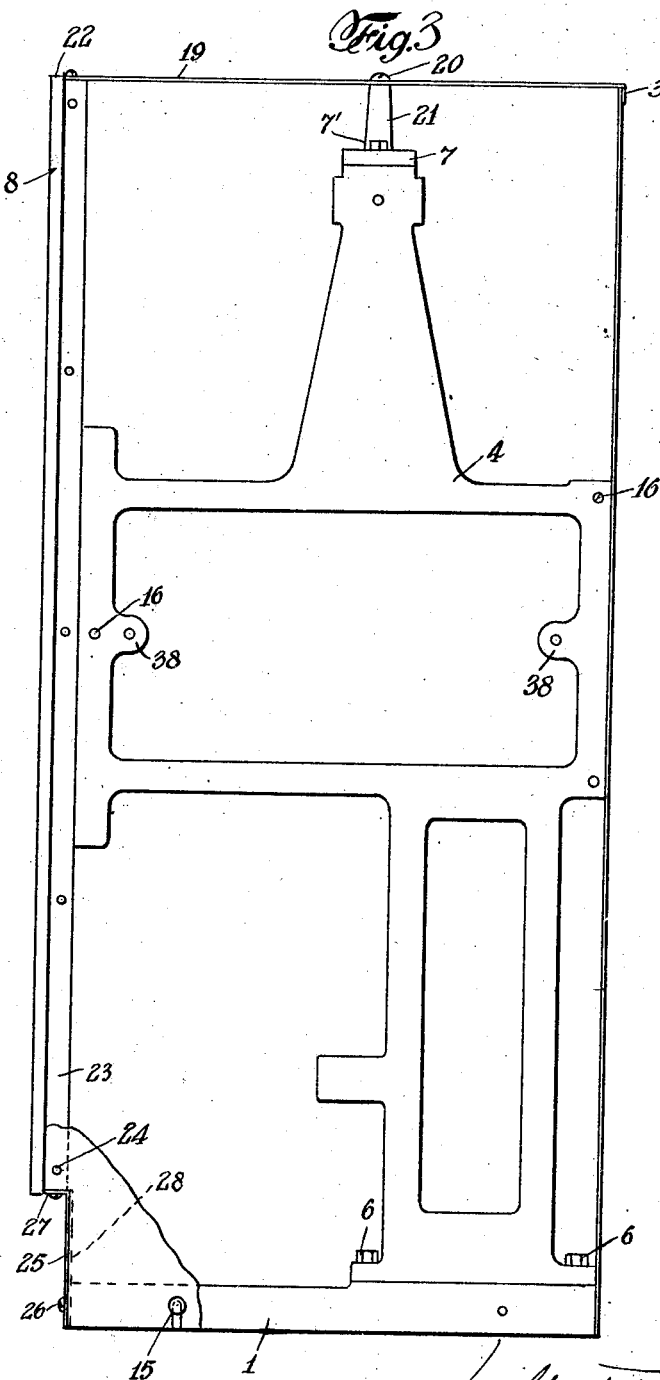

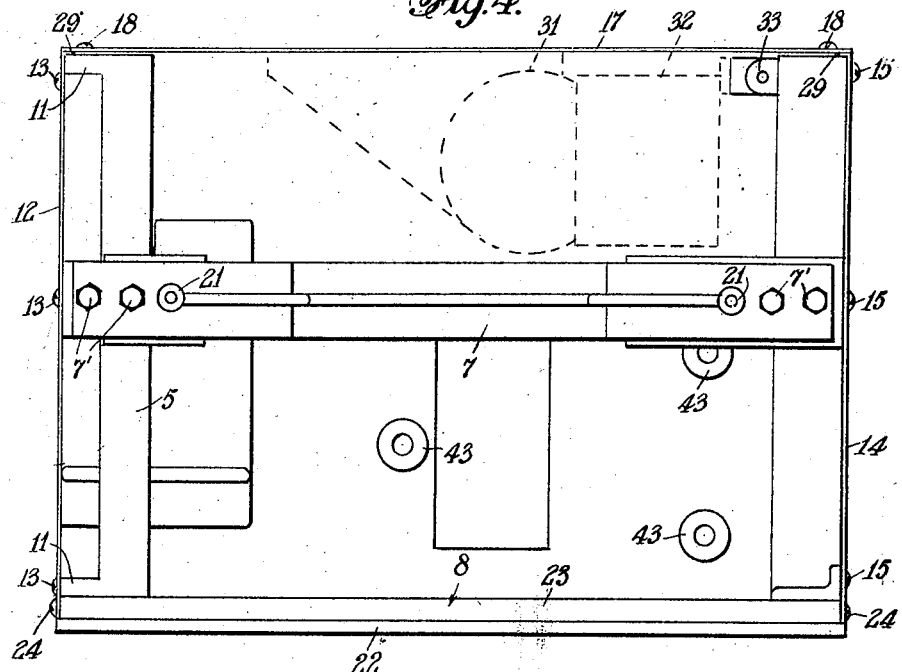
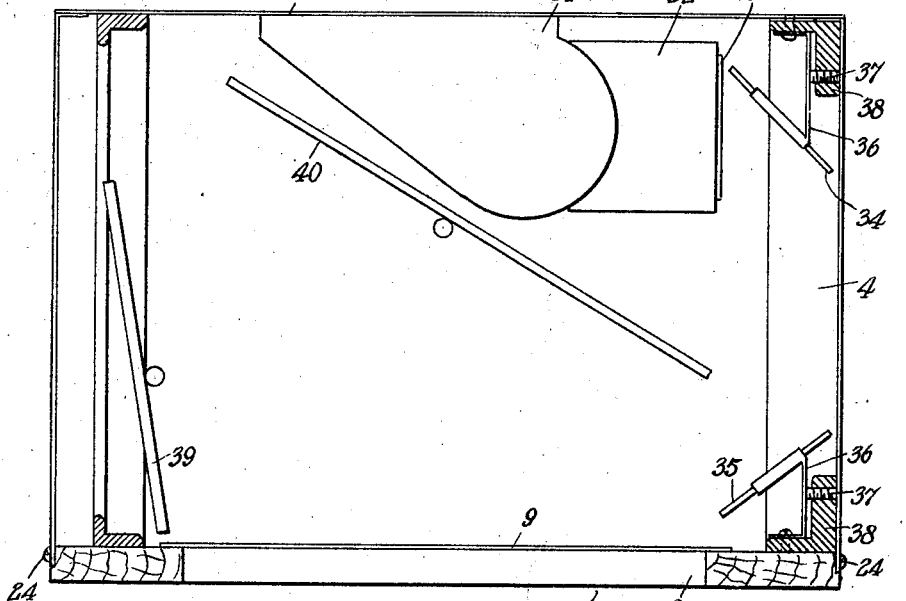

Patented July 1, 1930

1,769,050

UNITED STATES PATENT OFFICE

WILFRED T. BIRDSALL, OF MONTCLAIR, NEW JERSEY, ASSIGNOR TO TRANS-LUX DAYLIGHT PICTURE SCREEN CORPORATION, OF NEW YORK, N. Y., A CORPORATION OF DELAWARE

PROJECTOR

Application filed June 10, 1926. Serial No. 114,875.

This invention relates to a projector having certain novel and improved features of construction. While the construction may be adapted to a variety of different types of projectors, I shall describe and illustrate it in connection with a projector of the type shown and claimed in my co-pending application, Serial No. 114,404, filed June 8, 1926. That type of projector comprises an endless conveyor upon which are mounted a plurality of slides, in combination with means for intermittently operating the conveyor to bring the slides consecutively into projection position in relation to an optical system, to be projected on to a screen.

One of the objects of my invention is to provide a projector having a frame-work so constructed that the various elements of the optical system are always in correct alignment. This object I achieve by supporting all of these elements, and also the screen upon which the picture is projected, upon the same frame, by centrally pivoting the mirrors which form part of the system and which direct the beam of light to the screen, and by disposing the centers of the mirrors in correct alignment in the axis of the system and in proper relation to the source of light and to the screen as to distance. The mirrors may be adjusted on their pivots, if found necessary, but ordinarily one initial adjustment will be sufficient.

Another object of my invention is to provide a projector having a frame which will support the conveyor and operating means therefor, which, for the sake of simplicity, I shall call the projector mechanism, in such a manner as to permit ready access thereto for inspection and repairs, and without disturbing the elements of the optical system. This object I achieve by providing a base having a plurality of vertically disposed members at the edges thereof and connected together by suitable bracing means so as to form a rigid frame-work. The space between the frame members is left available for the projector mechanism and parts of the optical system, which may thus be easily reached. This arrangement, moreover, makes an extremely simple and compact construction and, by the economy of space thus effected, the employment of larger units is made possible. Moreover, by disposing the frame members adjacent the edge of the base they become available for support of the casing walls.

Still another object of my invention is to provide a projector casing so constructed as to permit ready access to one part of the projector contained therein without the necessity of exposing other parts. This object I achieve by so constructing the casing that any wall thereof may be readily removed without removing other walls.

A further object of my invention is to provide a projector having a screen in one wall thereof and so arranged as to enhance the appearance of the casing. Projectors of this type are usually employed for display purposes in positions where appearance is of primary importance and in the projectors constructed according to my invention the frame supporting the screen is designed to simulate a picture frame so that the views projected on the screen have the appearance of framed pictures. To add to this appearance I have constructed the projector casing in such a way as to conceal from the front all joints of the casing, so that an observer will see only the screen and the frame surrounding the same.

In the accompanying drawings in which I have shown a selected embodiment of my invention:

Figure 1 is a perspective view of a projector base and frame constructed according to my invention, Figure 2 is a front view of the casing with the front wall removed therefrom, this wall including the screen, Figure 3 is a side elevation of the projector as viewed from the right of Figure 2, Figure 4 is a plan view with the top wall or cover removed, and Figure 5 is a horizontal section through the projector and showing the relation of the various elements forming the optical system.

Referring now to the drawings in detail, it will be seen that the projector comprises a base 1, which is preferably formed of the top 2 supported by a peripheral flange 3, as indicated in Figure 2. Supported at opposite edges of the base are the vertical frame members 4 and 5. In the embodiment shown, these members are disposed at the sides of the casing, although it is to be understood that if conditions make it desirable to do so this arrangement may be varied. Each member is secured to the base as by bolts 6. The members 4 and 5 are secured together adjacent their upper ends by means of the brace 7 which may be secured to the frame members as by bolts 7'.

It will be seen that the members 4 and 5 have substantial portions thereof flush with the edges of the base, whereby the walls of the projector casing may be secured to the base and to the frame formed by the frame members and brace. The front wall consists largely of the frame 8 for the screen 9. This frame is secured to the frame members by means of screws passing through holes 10 and 10' shown in Figure 2 and received within the screen frame. The holes 10' are formed in ears 11 on the frame member 5 and these ears, as shown in Figures 2 and 4, are provided with flat surfaces to engage one side wall 12 of the casing and to receive screws 13 to fasten this wall to the frame member. It will be understood that the holes 10 and 10' are formed in portions of the frame members lying in the same plane and substantially flush with the front edge of the base 1.

The other side wall 14 is made fast to the frame member 4 as by screws 15, these screws being received within suitable holes 16 in the frame member, these holes appearing in Figure 3. The back wall 17 is likewise fastened to the frame members by suitable screws 18. The top wall or cover 19 is secured in position as by screws 20 received in upstanding lugs 21 on the brace 7.

It will be seen from an inspection of Figures 3 and 4 that the screen frame 8 is provided with a peripheral flange 22, this flange being of a thickness slightly greater than the thickness of one of the walls of the casing which are preferably of sheet material. The relation is such that when the walls 12 and 14 are secured in place the front edges thereof will contact with the edge 23 of the frame behind the flange 22 to which edge they are secured as by screws 24. The shoulder formed by the flange 22 will contact with the front edges of the walls 12 and 14 and will effectively conceal these edges. Similarly the wall 19 is secured to the screen frame and has its front edge contacting with the shoulder formed by the flange 22 so that this joint also is concealed. The front wall beneath the screen comprises a portion 25 formed of sheet material fastened to the base as by screws 26 and bending outwardly at 27 to engage the edge 23 of the screen frame, to which it is secured as by screws. The edge of the portion 27 is concealed behind the flange 22 as is plainly shown in Figure 3. The portion of each side of the walls 12 and 14 beneath the screen is folded in at 28 and secured in position behind the portion 25 of the front wall. The back edges of the side walls 12 and 14 are bent inwardly, as shown at 29, and overlapped by the edges of the back wall 17. This arrangement, however, is not such as to prevent removal of the side walls independently of the back wall. The top wall 19 is provided with a flange 30 on three sides thereof, which overlap the top edges of the side and rear walls.

With the arrangement as described above the screen frame is capable of being removed without disturbing other parts of the casing although the screen is usually left in position. The side, rear, or top walls may be removed, each independently of the other, so that access to any desired part of the mechanism contained within the casing may be had without removing the entire casing.

The optical system, which is best shown in Figure 5, may comprise a source of light contained in a lamp house 31 to which is secured a condenser housing 32, the two structures together being hinged upon the frame member 4 at 33. The slides which are to be projected upon the screen are fed consecutively into position at 32' in front of the condenser 32 in a manner described in my aforesaid co-pending application.

The beam of light from the condenser passes through a slide and is received upon a mirror 34 and thereby is deflected to a second mirror 35. These mirrors are supported upon brackets having arms 36 which are preferably of spring material and are secured to the frame member 4 as fully set forth in my aforesaid co-pending application. The mirrors 34 and 35 may then be said to be pivotally mounted on the frame, the arms 36 bending at the points where they are secured to the frame, this bending adjustment being caused by adjustment screws 37. These screws are received within ears 38 on the frame member.

From the mirror 35 the light beam passes across the back of the screen to the mirror 39 which deflects it to the mirror 40 which in turn deflects it to the screen. The arrangement of mirrors is more specifically described and is claimed in my aforesaid co-pending application. The projector mechanism may be of any suitable form. As herein shown it is of the form described and claimed in my aforesaid co-pending application and comprises a conveyor 41 supported on a plurality of rollers 42, one of which is a driven roller having means thereon positively engaging the conveyor to move it. The means for actuating the roller may comprise any suitable device for that purpose actuated from an electric motor. The particular actuating means forms no part of the present invention and has not been shown, for the sake of simplicity. The motor may conveniently be mounted on the bosses 43 provided for that purpose.

The mirror 39 is mounted in suitable brackets 39' in the frame member 5 and the mirror 40 is mounted on bearings 40', one of which is secured to the base 1 and the other to the brace 7. The conveyor is endless in form and is disposed with its center line adjacent to and substantially parallel with the rear wall 17. The bearings for the rollers 42 are single bearings permitting the rollers to be disposed adjacent the rear wall and with no bearings between the rollers and the wall. Therefore, when the rear wall 17 is removed, which can be done without disturbing the other parts of the casing, the conveyor is readily accessible and if desired it may be removed without the necessity of removing the rollers from their bearings and without the need of disturbing any of the bearings themselves. This arrangement is more fully described and claimed in my aforesaid co-pending application. For the purposes of this application I wish to stress the fact that the projection mechanism is supported, by the above arrangement, independently of the optical system, by which I mean that this mechanism may be placed in position and removed without disturbing the optical system.

It will be seen that the optical system is formed of elements which are all supported upon the frame formed by the two vertical members 4 and 5 and the brace 7. The pivots of the mirrors are parallel with each other, being vertical in this embodiment, and are centrally disposed of the mirrors. The pivots are carefully aligned in the axis of the optical system and, therefore, the centers of the mirrors will be always in alignment. The angle of each mirror to the optical axis may be adjusted by any suitable means but the alignment and spacing remains permanently fixed and is not affected by the adjustment. The lamp house and condenser housing being hinged to the frame member 4 may be swung out of the casing to permit the removal of the conveyor, but when swung back into the casing these elements will be in correct position in respect to the mirrors. The above arrangement of optical elements exemplifies an optical system in which the various elements thereof are fixed in permanent alignment. The frame being a rigid one, the centers of the elements will always be in correct alignment with respect to each other and in respect to the screen, which is also supported on the same frame.

The advantages of my invention have been fully pointed out during the progress of the description but they may be briefly summarized by stating that the construction is one in which the various elements of the optical system are accurately maintained in correct position in respect to the optical axis of the system, and also are maintained at the proper distance from each other. At the same time ready access may be gained to all parts of the apparatus with a minimum of disturbance. The construction is such as may be readily and cheaply made and is rugged in character so as to withstand the rough usage to which a projector of this character is subjected.

While I have shown my invention as incorporated in a certain embodiment, I, of course, realize that various changes in details of construction may be made without departing from the scope of my invention and I, therefore, do not intend to limit myself except by the appended claim.

I claim:

A projection apparatus casing comprising a base, a frame mounted thereon, means to support an optical system and a projector mechanism in said casing, a plurality of walls surrounding said frame and base, and means for securing each wall in position independently of the other walls, whereby each wall may be removed independently of the others to permit access to the contents of said casing.

In testimony whereof, I have affixed my signature to this specification.

WILFRED T. BIRDSALL.